US012137311B2

(12) United States Patent
Han et al.

(10) Patent No.: US 12,137,311 B2
(45) Date of Patent: Nov. 5, 2024

(54) EARPHONE WITH DUCT UNIT DIVIDING PRESSURE EQUILIBRIUM HOLE AND BACK HOLE

(71) Applicant: EM-TECH Co., Ltd., Gyeongsangnam-do (KR)

(72) Inventors: Jun Hee Han, Gyeongsangnam-do (KR); Yong Ju Ji, Gyeongsangnam-do (KR); Young Seok Noh, Gyeongsangnam-do (KR)

(73) Assignee: EM-TECH Co., Ltd., Gyeongsangnam-do (KR)

( * ) Notice: Subject to any disclaimer, the term of this patent is extended or adjusted under 35 U.S.C. 154(b) by 278 days.

(21) Appl. No.: 17/715,537

(22) Filed: Apr. 7, 2022

(65) Prior Publication Data

US 2022/0329926 A1 Oct. 13, 2022

(30) Foreign Application Priority Data

Apr. 9, 2021 (KR) .......................... 1020210046547

(51) Int. Cl.

*H04R 1/10* (2006.01)
*H04R 1/28* (2006.01)
*H04R 9/02* (2006.01)

(52) U.S. Cl.

CPC ......... *H04R 1/1016* (2013.01); *H04R 1/2869* (2013.01); *H04R 9/025* (2013.01); *H04R 2460/11* (2013.01)

(58) Field of Classification Search

CPC .......................... H04R 1/2869; H04R 1/2873; H04R 2460/11; H04R 9/025; H04R 1/1016; H04R 1/2888

See application file for complete search history.

(56) References Cited

U.S. PATENT DOCUMENTS

| | | | | |
|---|---|---|---|---|
| 4,742,887 | A | 5/1988 | Yamagishi | |
| 2020/0404437 | A1 * | 12/2020 | Chmielewski ......... | H04R 25/60 |

FOREIGN PATENT DOCUMENTS

| | | | |
|---|---|---|---|
| KR | 100694160 | B1 | 3/2007 |
| KR | 101558091 | B1 | 10/2015 |
| KR | 101644738 | B1 | 8/2016 |
| KR | 102172836 | B1 | 11/2020 |

* cited by examiner

*Primary Examiner* — Kile O Blair

(74) *Attorney, Agent, or Firm* — Murphy, Bilak & Homiller, PLLC

(57) ABSTRACT

The present disclosure provides an earphone with a duct unit dividing a pressure equilibrium hole and a back hole. The earphone includes a driver unit including a frame, a magnetic circuit, a voice coil, a diaphragm configured to reproduce sound, and a pressure equilibrium hole configured to improve a pressure difference between front and rear sides of the driver unit, and a back hole configured to smooth vibration of the diaphragm. A housing allows the driver unit to be installed therein and includes a vent hole. A duct unit provided in the housing adjusts a size of a back volume in the housing and provides a flow path from the pressure equilibrium hole to the vent hole.

8 Claims, 14 Drawing Sheets

EARPHONE WITH DUCT UNIT DIVIDING PRESSURE EQUILIBRIUM HOLE AND BACK HOLE

TECHNICAL FIELD

The present disclosure relates to an earphone with a duct unit dividing a pressure equilibrium hole and a back hole.

BACKGROUND

Earphones are classified into closed air type and opened air type according to a shape of a housing in which a sound transducer is embedded. The closed air type refers to an earphone in which the housing is sealed from the outside, and the open air type refers to an earphone in which a small hole (called a back hole) is formed on a rear edge of the housing to allow the inside of the housing to communicate with the outside.

In the case of the closed air type, a sound pressure inside the ear varies depending on a state in which an earphone is inserted, and thus, sound quality during listening may vary depending on the state in which the earphone is inserted. Meanwhile, in the case of the opened air earphone, since the inside of the housing communicates with the outside, the sound pressure inside the ear may be maintained to be constant from a low range to a high range. Meanwhile, in the opened air type earphone, a ventilation resistor using a urethane foam or the like is installed in the back holes installed in the housing to prevent mixing of external sound.

Meanwhile, in an opened air type earphone, resonance occurs between a mid-range and a high range of an acoustic signal depending on a size of the back hole and a peak of sound pressure occurs between the mid-range and high range due to the resonance, thereby lowering frequency characteristics of the earphone. In order to solve the problem, an opened air type earphone having a duct has been developed. Such an opened air type earphone having a duct is disclosed in U.S. Pat. No. 4,742,887.

However, in the case of forming a duct, a housing of the earphone needs to have an elongated portion in addition to an earbud portion inserted into the ear, which is disadvantageous in terms of design, and since a duct space needs to be included, an overall size of the earphone increases.

In order to improve the shortcomings, a structure in which a back hole is formed in the housing of the earphone and a pressure equilibrium hole of a driver unit is connected to a rear space of the driver unit connected to the back hole has been proposed, FIG. 1 is a view illustrating an earphone having a pressure equilibrium structure according to the related art.

A driver unit 10 for reproducing sound is installed in a space defined by a front housing 20 and an inner case 30. A space remaining after the driver unit 10 is installed in the space defined by the front housing 20 and the inner case 30 is utilized as a back volume 24, and the driver unit 10 is discharged toward the user's ear canal through a front volume 22 formed in front of the front housing 20. In a space between the inner case 30 and a rear housing 40, components such as a battery and a control circuit are installed.

The driver unit 10 has a pressure equilibrium hole (not shown) capable of reducing a pressure difference between the front and rear sides of the driver unit 10 in order to improve the user's ear deafening due to the pressure difference. The pressure equilibrium hole is connected to the back volume 24. In addition, a back hole is formed on a rear surface of the driver unit 10 so that a diaphragm of the driver unit 10 may vibrate smoothly, and the back hole of the driver 10 also communicates with the back volume 24. A vent hole 25 is also formed in the front housing 20 to communicate with the back volume 24.

However, in the pressure equilibrium structure according to the related art, the back volume 24 communicates with the back hole of the driver unit 10 and the pressure equilibrium structure at the same time, and one vent hole 25 is formed in the front housing 20 as well. In this case, when the vent hole 25 is opened, a pressure difference may be improved, but pressure leakage occurs to degrade sound reproduction performance of the driver 10, and when the vent hole 25 is closed, driver performance may be improved but the pressure difference cannot be improved. Therefore, there is a need to develop a ventilation structure in which the back hole of the driver and the pressure equilibrium structure are separately controlled so that the performance of the driver is not deteriorated while the pressure difference is improved.

SUMMARY

An aspect of the present disclosure is to provide an earphone with a duct unit dividing a pressure equilibrium hole and a back hole so that the performance of a driver is not deteriorated, while a pressure difference is improved.

In an aspect, an earphone with a duct unit dividing a pressure equilibrium hole and a back hole includes: a driver unit including a frame, a magnetic circuit, a voice coil, and a diaphragm to reproduce sound and further including a pressure equilibrium hole for improving a pressure difference between the front and the rear and a back hole for smoothing vibration of the diaphragm; a housing allowing the driver unit to be installed therein and including a vent hole; and a duct unit provided in the housing, adjusting a size of a back volume in the housing, and providing a flow path from the pressure equilibrium hole to the vent hole.

As another example of the present disclosure, the duct unit may divide the flow path from the pressure equilibrium hole to the vent hole and a flow path from a back hole to the vent hole separately.

As another example of the present disclosure, the duct unit may include a first duct connecting the pressure equilibrium hole to the vent hole; and a second duct connecting the back hole to the vent hole.

As another example of the present disclosure, the earphone may further include: a pressure equilibrium mesh configured to adjust an amount of ventilation through the pressure equilibrium hole; and a back hole mesh configured to adjust an amount of ventilation through the back hole.

In addition, as another example of the present disclosure, the duct unit may include a vent hole coupling portion coupled to the vent hole and may include a first duct connecting the pressure equilibrium hole to the vent hole coupling portion.

In another embodiment of the present disclosure, the earphone may further include: a back volume formed in the housing and communicating with the back hole of the driver unit; and a communication hole allowing the back volume and the pressure equilibrium hole to communicate with each other and formed in the vent hole coupling portion.

Also, as another example of the present disclosure, the vent hole coupling portion may include a partition configured to partition a communication hole forming portion and the first duct.

In addition, as another example of the present disclosure, the earphone may further include: a back hole mesh installed in the communication hole and configured to adjust an amount of ventilation flowing in and out through the back hole; and a pressure equilibrium mesh installed in the vent hole coupling portion and configured to adjust an amount of ventilation flowing in and out through the pressure equilibrium hole.

Also, as another example of the present disclosure, the duct unit may include a protrusion protruding to the rear to secure the back volume.

The earphone provided by the present disclosure includes a duct unit dividing a pressure equilibrium hole and a back hole, thereby achieving both pressure equilibrium and earphone performance improvement.

In the earphone provided by the present disclosure, since the duct unit installed in a space used as a back volume, a size of the back volume may be adjusted by adjusting a size of the duct unit, without changing a size or shape of a front housing, an inner case, or driver unit.

In addition, by forming a flow path from a pressure equilibrium hole of the driver unit to a vent hole of a front housing in the duct unit, an air flow into and out of the back hole of the driver unit and an air flow into and out of the pressure equilibrium hole of the driver unit may be separated.

DETAILED DESCRIPTION

Hereinafter, the present disclosure will be described in more detail with reference to the drawings.

Figure 1:
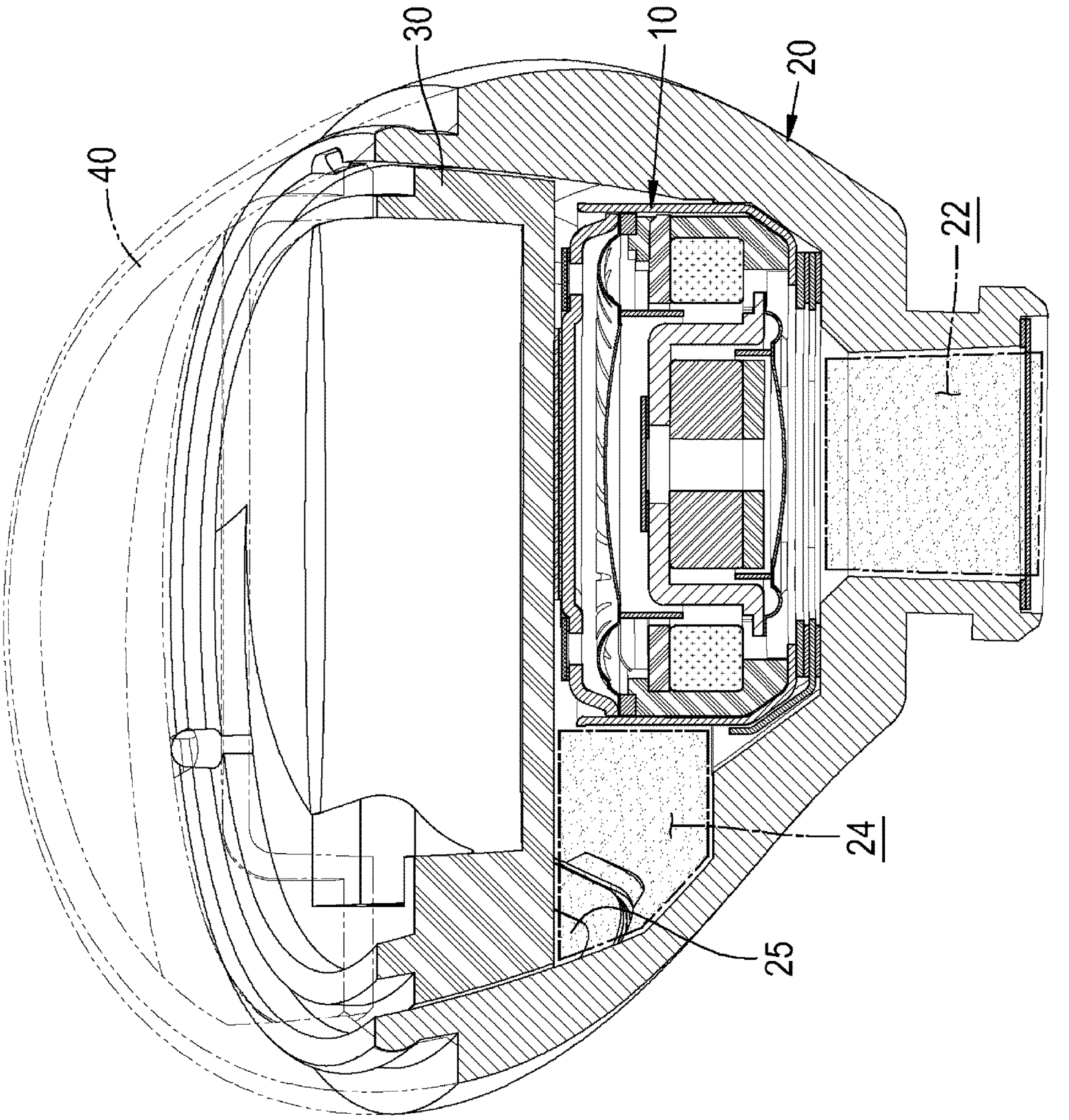
FIG. 1 is a view illustrating an earphone having a pressure equilibrium structure according to the related art.
Figure 2:
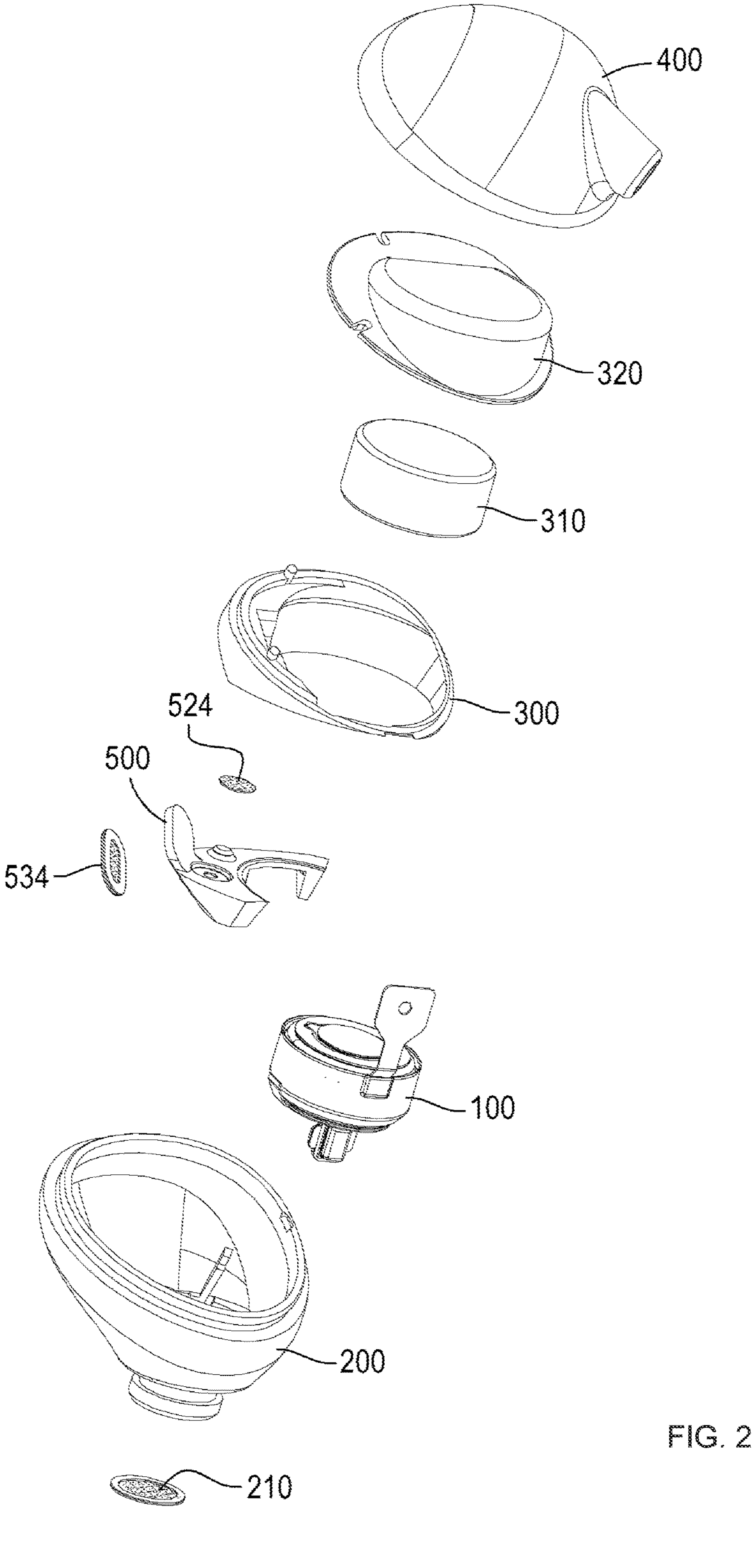
FIG. 2 is an exploded view of an earphone with a duct unit dividing a pressure equilibrium hole and a back hole according to a first embodiment of the present disclosure.
Figure 3:
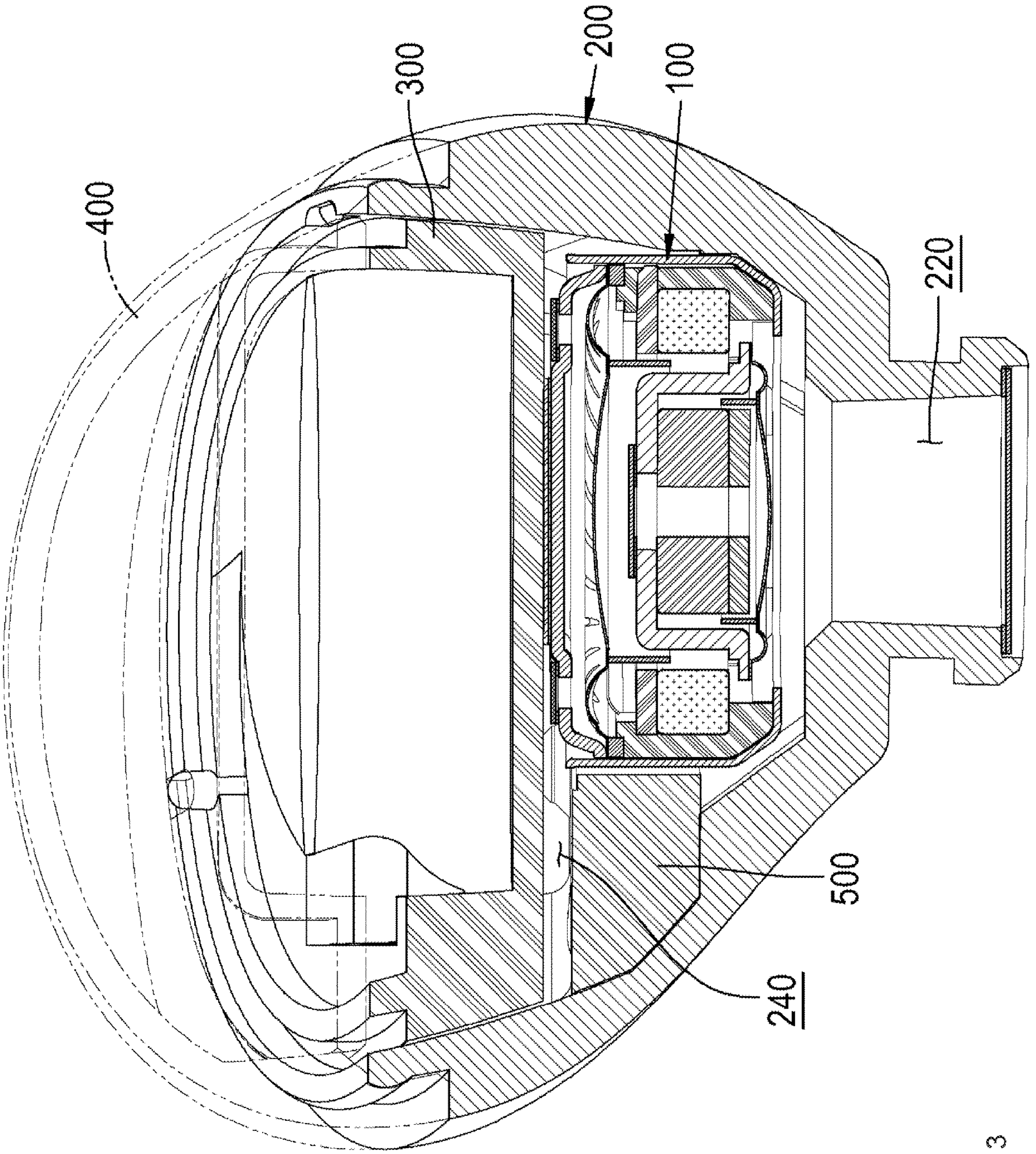
FIG. 3 is a cross-sectional view of the earphone with a duct unit dividing a pressure equilibrium hole and a back hole according to the first embodiment of the present disclosure.

FIG. 2 is an exploded view of an earphone with a duct unit dividing a pressure equilibrium hole and a back hole according to a first embodiment of the present disclosure, and FIG. 3 is a cross-sectional view of an earphone with a duct unit dividing a pressure equilibrium hole and a back hole according to the first embodiment of the present disclosure.

The earphone with a duct unit dividing a pressure equilibrium hole and a back hole according to the first embodiment of the present disclosure includes a driver u nit 100 and a front housing 200 and a rear housing 400 covering 1 the driver unit 100 and forming an exterior. An inner case 300 is installed in the front housing 200 and the rear housing 400 to divide an installation space of the driver unit 100 and an installation space of a battery 310. The battery 310 is fixed on the inner case 300 by a battery cover 320.

Sound reproduced by the driver unit 100 is emitted toward a front of the front housing 200, and a mesh 210 is installed in a sound emission kernel 220 to prevent inflow of foreign substances.

The driver unit 100 is installed in a space defined by the front housing 200 and the inner case 300, and a duct unit 500 is installed on one side of the driver unit 100. A space that may be utilized as a back volume 240 is formed between the duct unit 500 and the inner case 300. Since the duct unit 500 is installed in a space utilized as a back volume, a size of the back volume 240 may be adjusted by adjusting the duct unit 500, without changing a size or shape of the front housing 200, the inner case 300, or the driver unit 100. In addition, by forming a flow path from a pressure equilibrium hole of the driver unit 100 to a vent hole of the front housing 200 in the duct unit 500, an air flow into and out of a back hole (not shown) of the driver unit 100 and an air flow into and out of the pressure equilibrium hole of the driver unit 100 may be separated.

Figure 4:
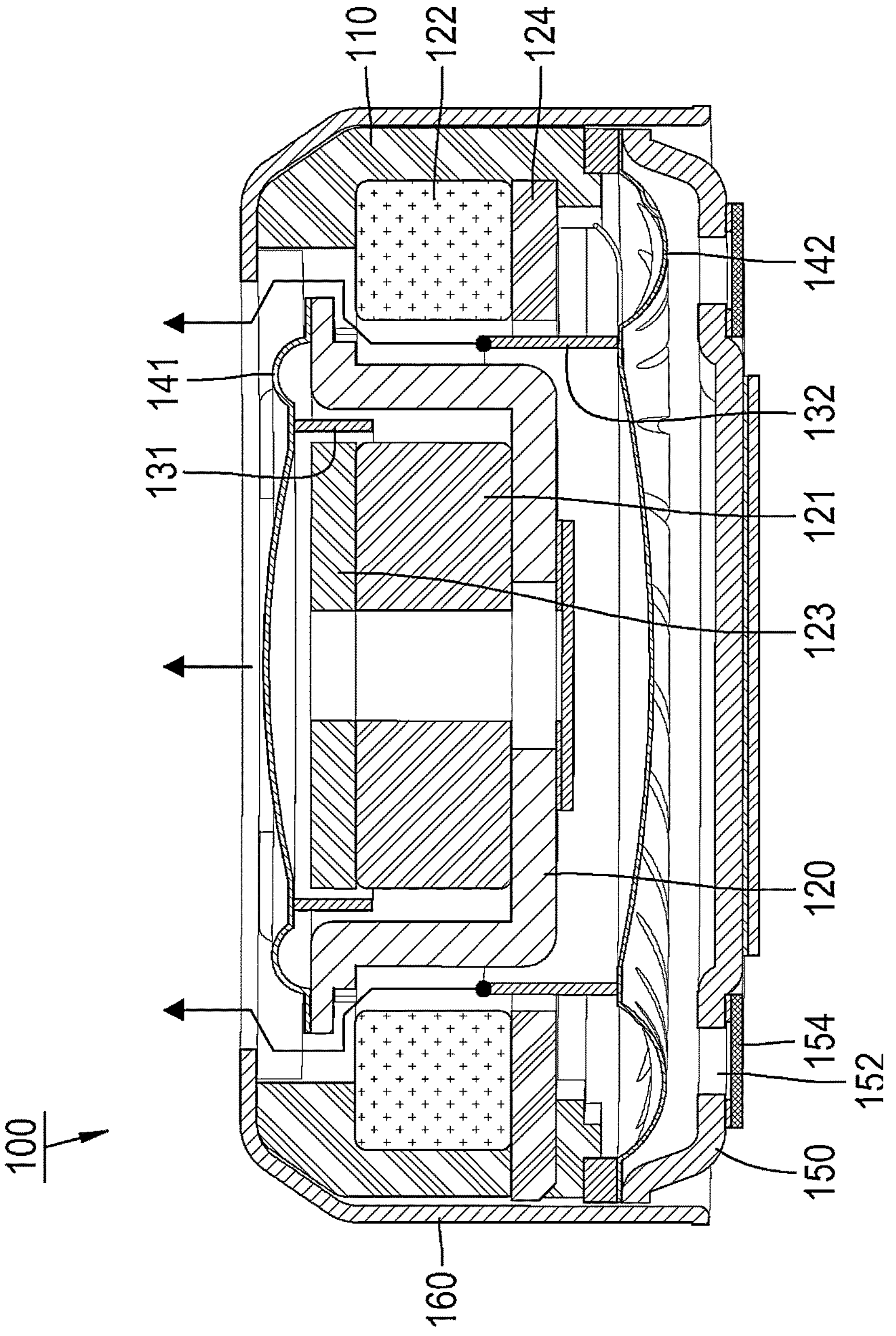
FIG. 4 is a cross-sectional view illustrating a driver unit provided in the earphone with a duct unit dividing a pressure equilibrium hole and a back hole according to the first embodiment of the present disclosure.

FIG. 4 is a cross-sectional view illustrating a driver unit included in an earphone with a duct unit dividing a pressure equilibrium hole and a back hole according to the first embodiment of the present disclosure.

In the driver unit 100, a first magnet 121 and a first top plate 123 are attached to an inner side of a cylindrical yoke 120 at a distance from a sidewall of a yoke 120. A first voice coil 131 is attached to a gap between the first magnet 121 and the sidewall of the yoke 120, and one end of the first voice coil 131 is attached to a first diaphragm 141. An outer periphery of the first diaphragm 141 is attached to an outer periphery of the first yoke 120, and the first diaphragm 141 vibrates by the mutual electromagnetic force between the first voice coil 131 and the magnetic circuit to emit a first sound.

In addition, a ring-shaped second magnet 122 is installed on the outside of the yoke 120 at a distance from the sidewall of the cylindrical yoke 120, and a second top plate 124 is attached to a rear surface of the second magnet 122. The second magnet 122 and an outer periphery of the second top plate 124 are coupled to the frame 110. A second voice coil 132 is attached to a gap between the sidewall of the cylindrical yoke 120 and the second magnet 122, and one end of the second voice coil 132 is attached to a second diaphragm 142.

A case 160 is coupled to the outside of the frame 110. The case 160 protects components constituting the driver unit 100. The case 160 surrounds an outer surface and a portion of a front surface of the frame 110, and a sound emission hole is formed in the center of the front surface of the case 160, so that sound generated by the first diaphragm 141 and the second diaphragm 142 is emitted. A grille 150 is installed on a rear surface of the frame 110, and an outer periphery of the grille 150 is fixed to an inner surface of the case 160. The grille 150 protects the second diaphragm 142 and forms an exterior of the drive unit 100 together with the case 160.

Figure 5:
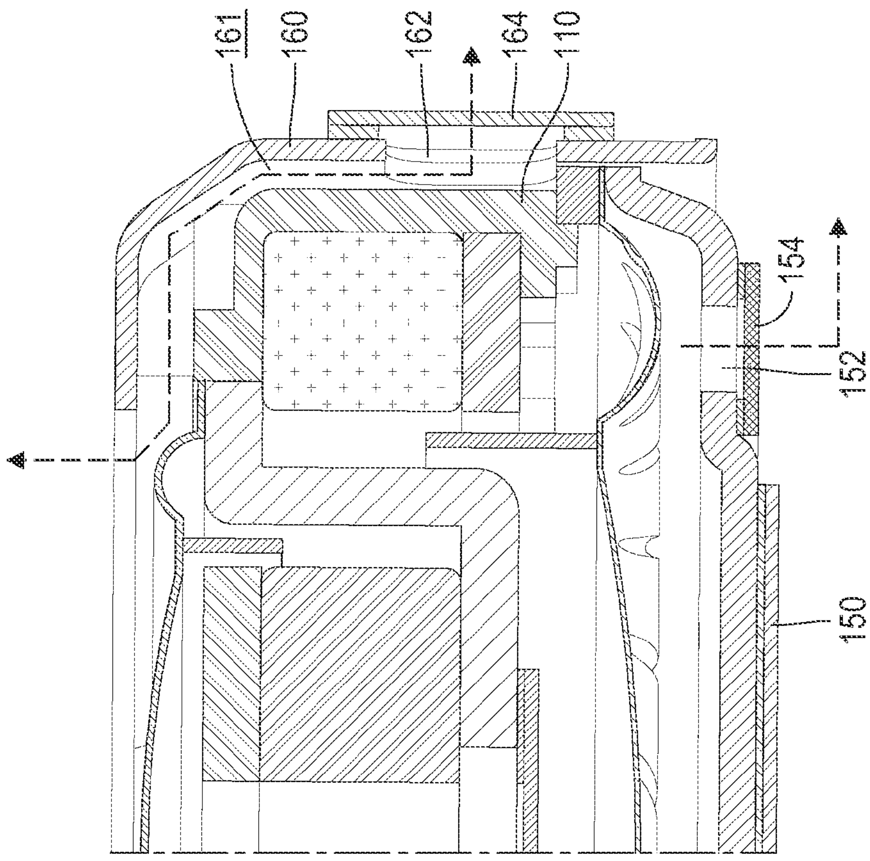
FIG. 5 is a partial cross-sectional view illustrating an air flow structure of a driver unit provided in the earphone with a duct unit dividing a pressure equilibrium hole and a back hole according to the first embodiment of the present disclosure.

FIG. 5 is a partial crass-sectional view illustrating an air flow structure of a driver unit provided in the earphone with a duct unit dividing a pressure equilibrium hole and a back hole according to the first embodiment of the present disclosure. Referring to FIGS. 4 and 5, the grille 150 has a back hole 152, which allows for an air flow, formed between the rear surfaces of the diaphragms 141 and 142 and an external space so that the diaphragms 141 and 142 may vibrate smoothly. A mesh 154 is formed in the back hole 152 to adjust an amount of ventilation and prevent inflow of foreign substances.

Meanwhile, when the front and rear sides of the driver unit 100 are sealed, a pressure difference between the front and rear sides of the driver unit 100 may cause deafness or pain in the user's ears, and thus, a structure for pressure equilibrium between the front and rear sides of the driver unit 100.

A recess is formed on an outer periphery of the frame 110 to form a flow path 161 for pressure equilibrium between the case 160 and the frame 110, and a pressure equilibrium hole 162 may be formed in the case 160 to allow air to pass in and out of the driver unit 100 through the flow path 161 for pressure equilibrium. Here, the pressure equilibrium hole 162 is formed on a side surface of the case 160, and a mesh 164 for adjusting the amount of ventilation flowing in and out through the pressure equilibrium hole 162 and preventing inflow of foreign substances may be attached thereto.

Figure 6:
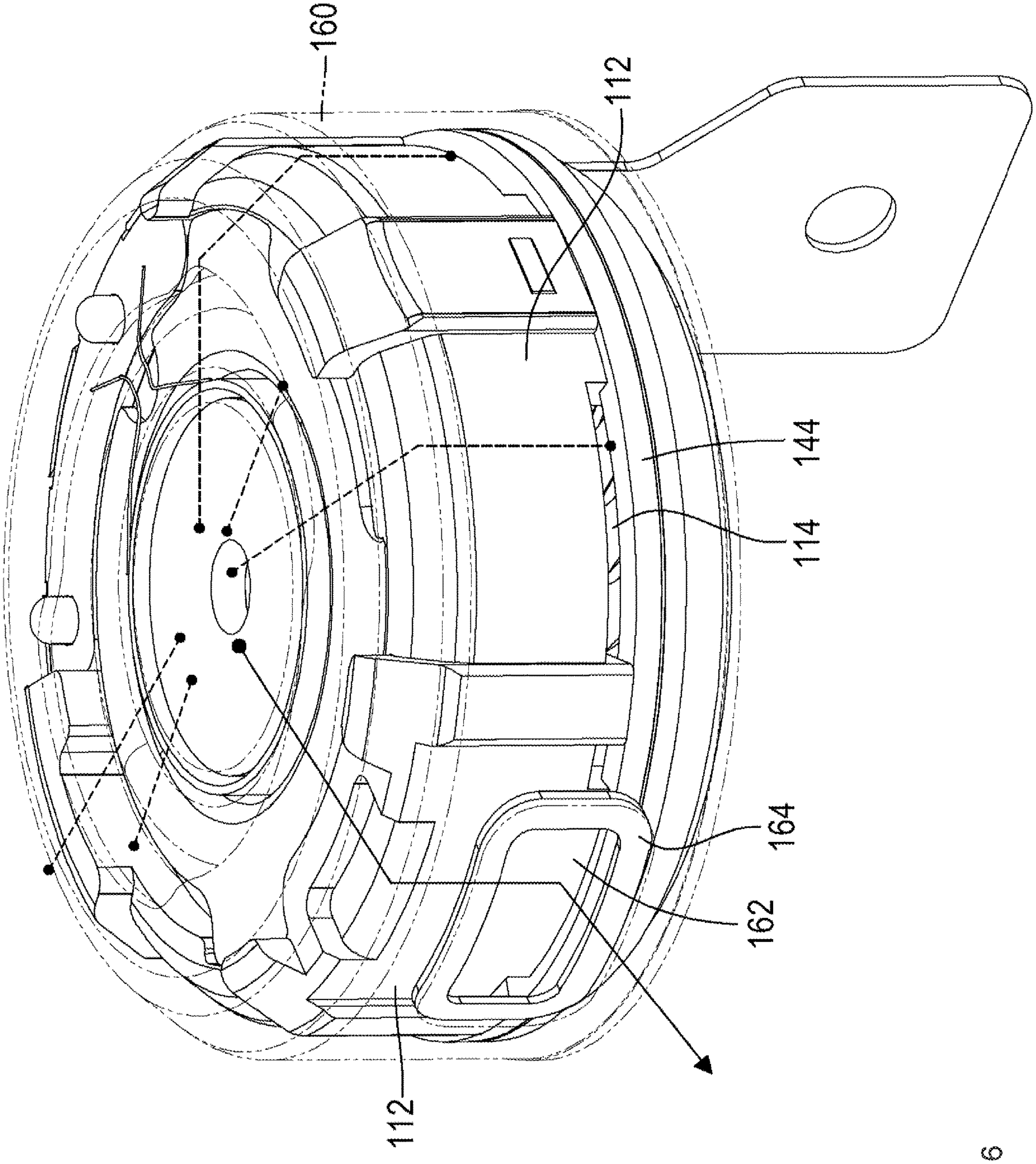
FIG. 6 is a perspective view of a pressure equilibrium structure of a driver unit provided in the earphone with a duct unit dividing a pressure equilibrium hole and a back hole according to the first embodiment of the present disclosure.

FIG. 6 is a perspective view of a pressure equilibrium structure of a driver unit provided in the earphone with a duct unit dividing a pressure equilibrium hole and a back hole according to the first embodiment of the present disclosure.

As described above, a plurality of recesses 112 are formed on the outer surface of the frame 110 to have a gap with the inner surface of the case 160. The recess 112 may allow air to communicate with the front of the driver unit 110 with air. Here, a slit 114 is formed on a bottom surface of the recess 112 so that air may communicate with a front surface (a surface to which the voice coil is attached) of the second diaphragm 142. The slit 114 is formed by partially removing a rear side wall of the frame 110 so that a space is formed with a strength reinforcement ring 144 attached to an outer periphery of the second diaphragm 142.

Meanwhile, by forming the pressure equilibrium hole 162 on one side of the case 160 facing the recess 112, the front of the drive unit 100 and an outer space of the drive unit 100 may communicate with each other.

Figure 7:
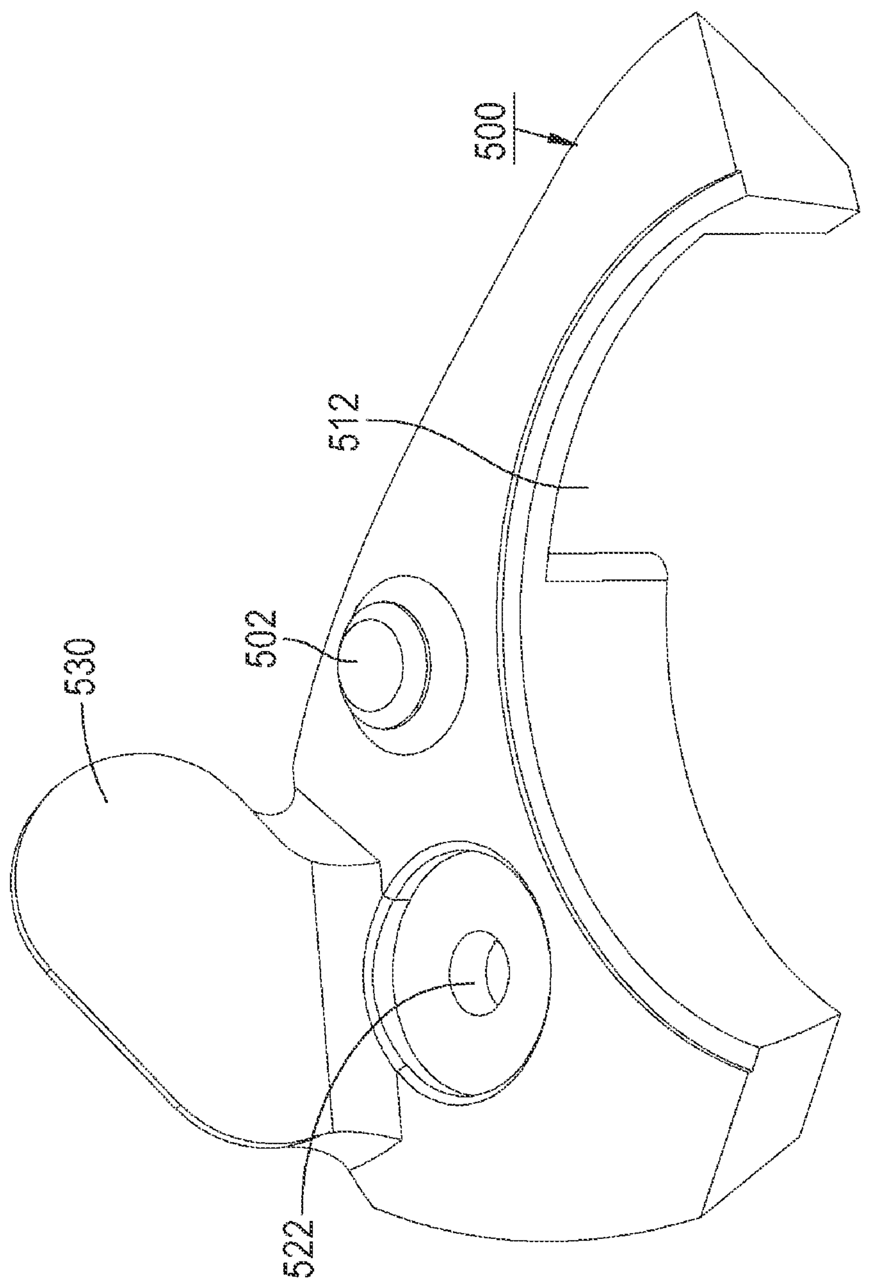
FIG. 7 is a rear perspective view of a duct unit dividing a pressure equilibrium hole and a back hole provided in the earphone according to the first embodiment of the present disclosure.
Figure 8:
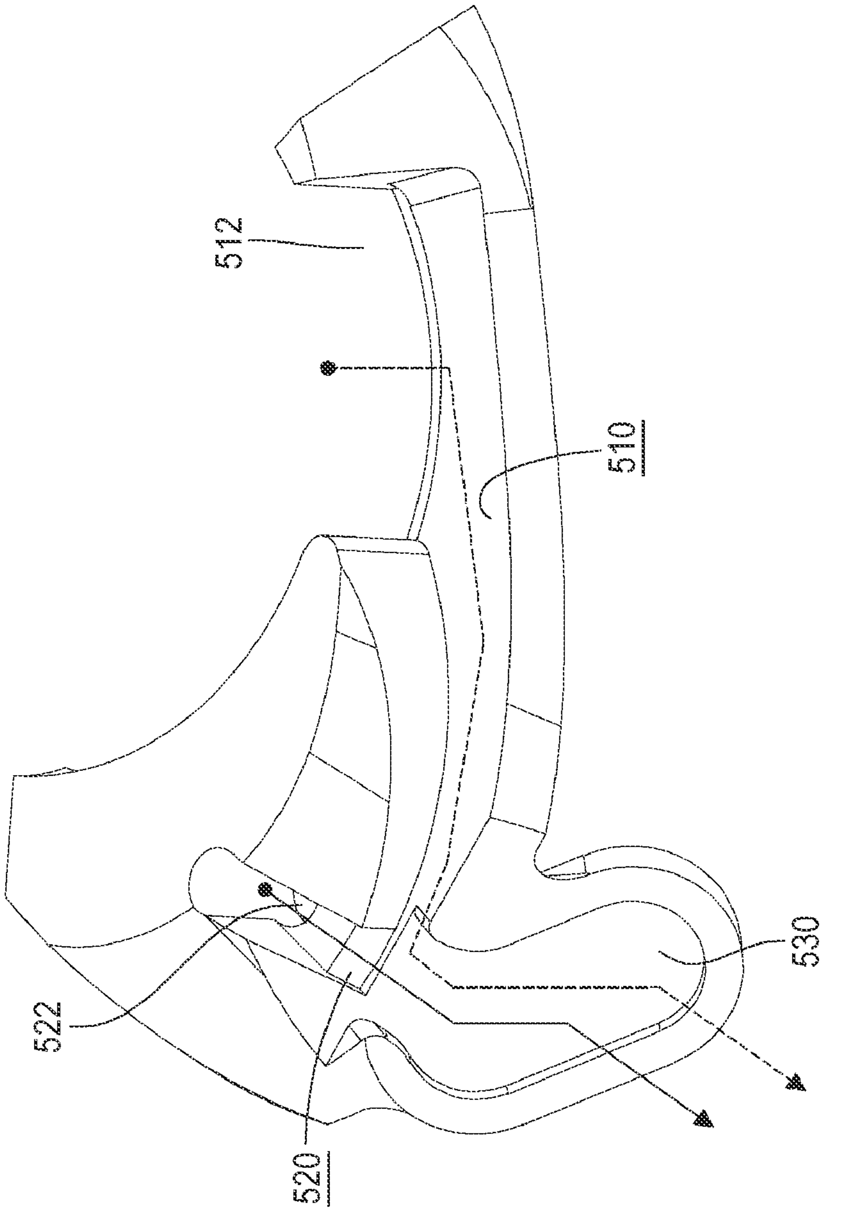
FIG. 8 is a front perspective view of the duct unit dividing a pressure equilibrium hole and a back hole provided in the earphone according to the first embodiment of the present disclosure.
Figure 9:
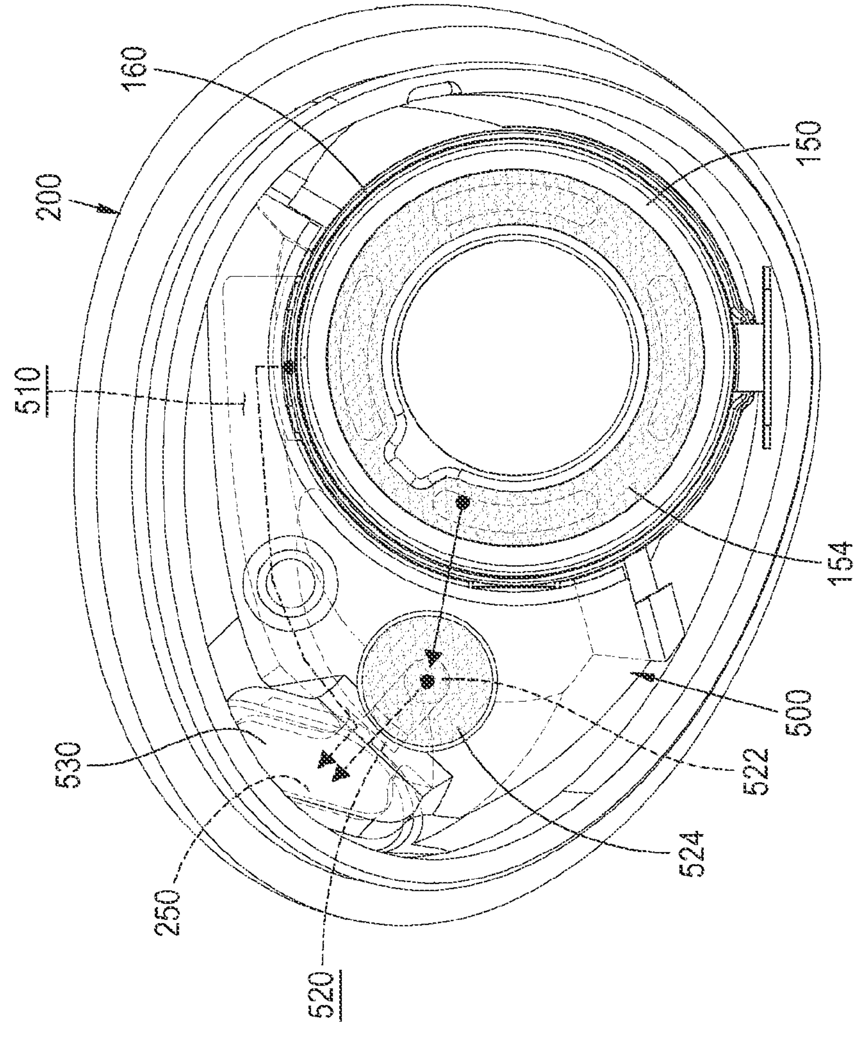
FIG. 9 is a view illustrating a state in which a duct unit dividing a pressure equilibrium hole and a back hole provided in the earphone according to the first embodiment of the present disclosure is installed in a front case.

FIG. 7 is a rear perspective view of a duct unit dividing a pressure equilibrium hole and a back hole provided in the earphone according to the first embodiment of the present disclosure, FIG. 8 is a front perspective view of the duct unit dividing a pressure equilibrium hole and a back hole provided in the earphone according to the first embodiment of the present disclosure, and FIG. 9 is a view illustrating a state in which a duct unit dividing a pressure equilibrium hole and a back hole provided in the earphone according to the first embodiment of the present disclosure is installed in a front case.

As described above, the duct unit 500 provided in the earphone according to the first embodiment of the present disclosure is installed on one side of the driver unit 100 (refer to FIG. 3) after the driver unit 100 is installed in a space between the front housing 200 and the inner case 300.

The duct unit 500 has a first inlet 512 through which air communicates with the pressure equilibrium hole 162 of the case 160. The first inlet 512 introduces air into a first duct 510 provided for pressure equilibrium. The first duct 510 connects the first inlet 512 to a vent hole coupling portion 530, and the vent hole coupling portion 530 is coupled to communicate with a vent hole 250 of the front housing 200 (refer to FIG. 3).

The duct unit 500 includes a protrusion 502 for securing a space with the inner case 300. Air flowing into the back hole 152 (refer to FIG. 5) of the grille 150 flows into and out of a communication hole 522 of the duct unit 500 through the space 240 (refer to FIG. 3) secured by the protrusion 502. The communication hole 522 introduces air into a second duct 520, and the second duct 520 connects the communication hole 522 to the vent hole coupling portion 530. The vent hole coupling portion 530 seals the periphery of the vent hole 250 so that air flowing into and out of the vent hole 250 flows only to the first duct 510 and the second duct 520.

A portion indicated by a yellow arrow in FIG. 9 shows flow of air flowing in and out through the back hole 152 of the drive unit 100, and a portion indicated in green represents flow of air flowing in and out through the pressure equilibrium hole 162 of the driver unit 100 and the first duct 510. Referring to FIG. 2, the duct unit 500 includes a back hole mesh 524 controlling the amount of air flowing in and out through the communication hole 522 and preventing inflow of foreign substances. In addition, a pressure equilibrium mesh 234 controlling the amount of air flow between the vent hole coupling portion 530 and the vent hole 250 and preventing inflow of foreign substances is installed.

Accordingly, flow of air flowing into and out of the pressure equilibrium hole 162 for pressure equilibrium of the drive unit 100 and flow of air flowing in and out through the back hole 152 for smooth vibration of the diaphragms 141 and 142 of the drive unit 100 are divided separately, and therefore, a flow amount of air flowing into and out of the pressure equilibrium hole 162 and the flow amount of air flowing into and out of the back hole 152 may be separately controlled.

In the case of the back hole 152, which deteriorates in performance when the amount of ventilation increases, the back hole mesh 524 may be configured to decrease the amount of air flow, and in the case of the pressure equilibrium hole 151, which is not improved in deafness when the amount of ventilation is lowered, the pressure equilibrium mesh 234 may be configured to increase the amount of air flow.

Figure 10:
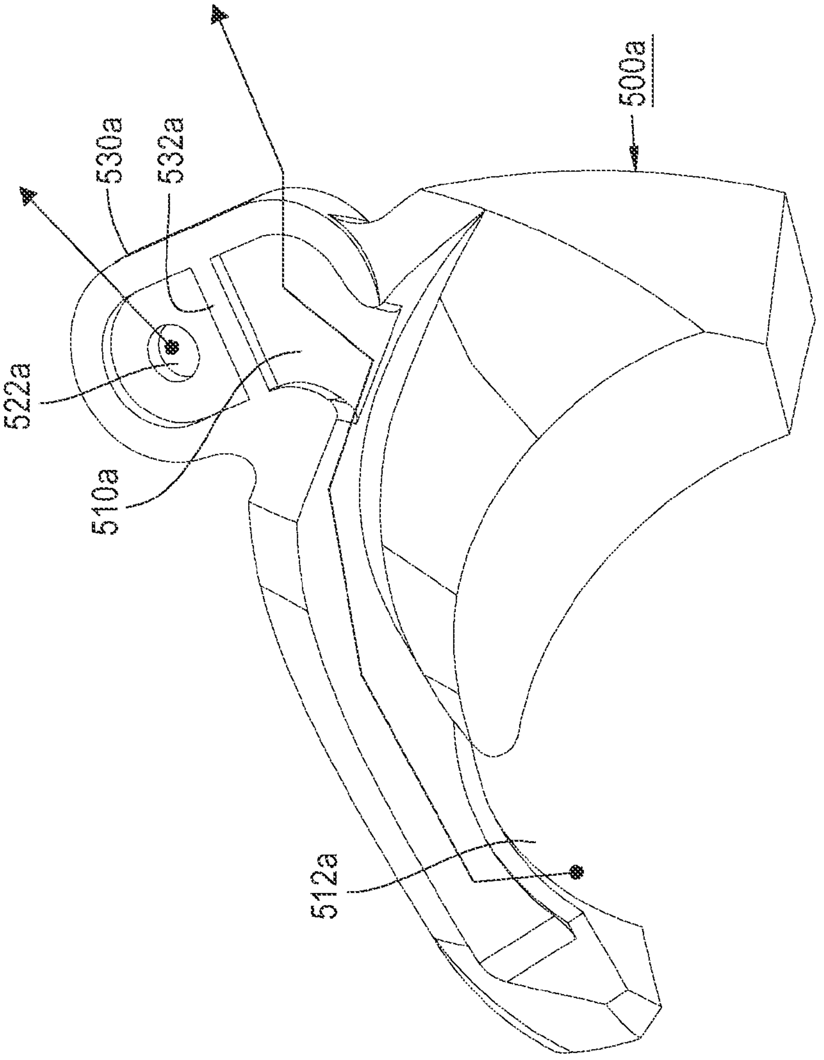
FIG. 10 is a rear perspective view of a duct unit dividing a pressure equilibrium hole and a back hole provided in an earphone according to a second embodiment of the present disclosure.
Figure 11:
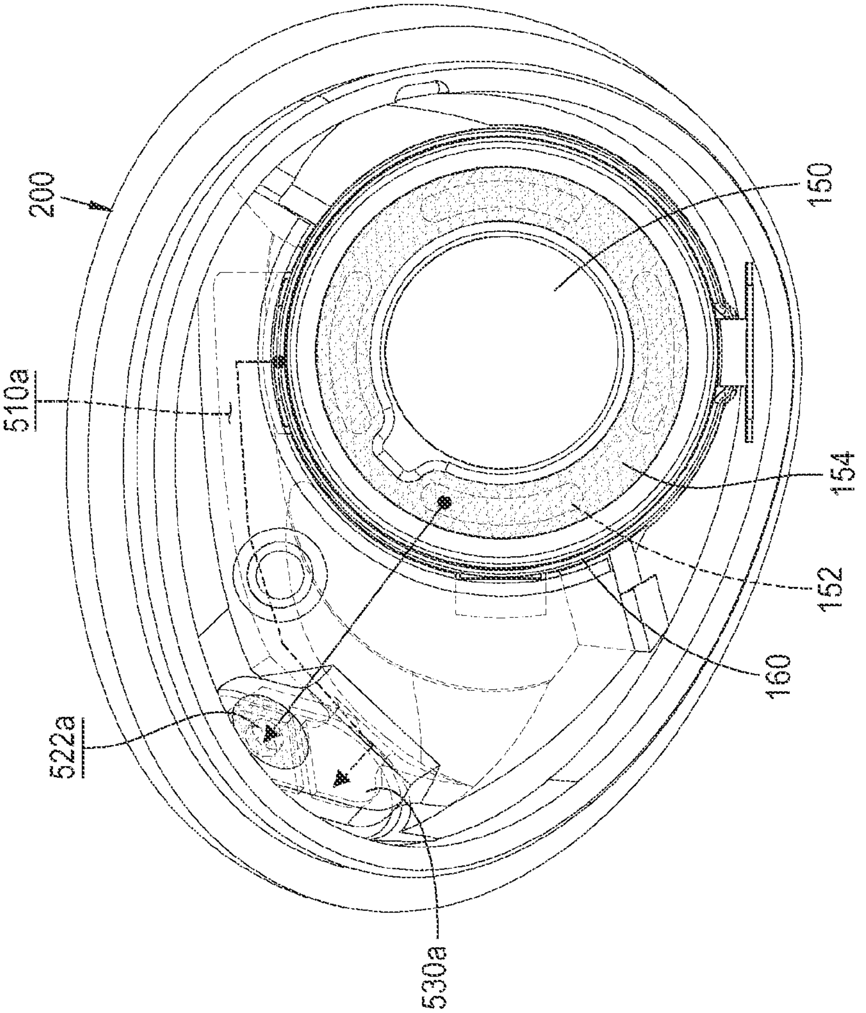
FIG. 11 is a view illustrating a state in which the duct unit dividing a pressure equilibrium hole and a back hole according to the second embodiment of the present disclosure is installed in a front housing.

FIG. 10 is a rear perspective view of a duct unit dividing a pressure equilibrium hole and a back hole provided in an earphone according to a second embodiment of the present disclosure, and FIG. 11 is a view illustrating a state in which the duct unit dividing a pressure equilibrium hole and a back hole according to the second embodiment of the present disclosure is installed in a front housing.

The earphone with a duct unit dividing a pressure equilibrium hole and a back hole according to the second embodiment of the present disclosure is the same as the first embodiment except for a shape of the duct unit. Therefore, redundant descriptions will be omitted.

A duct unit 500*a* according to the second embodiment of the present disclosure has a first duct 510*a* communicating with a first inlet 512*a*, and the other end of the first duct 510*a* extends to a vent hole coupling portion 530*a*. That is, a shape of the first duct 510*a* is the same as that of the first embodiment. However, a communication hole 522*a* through which the aft flowing through the back hole 152 of the drive unit 100 flows in and out is formed directly in the vent hole coupling portion 530*a*. Here, the vent hole coupling portion 530*a* includes a partition 532*a* to separate the first duct 510*a* and the communication hole 522*a* not to be connected to each other.

In the drawing, the yellow arrow indicates flow of air communicating with the back hole 152, and the green arrow indicates flow of air communicating with the pressure equilibrium hole 162.

Figure 12:
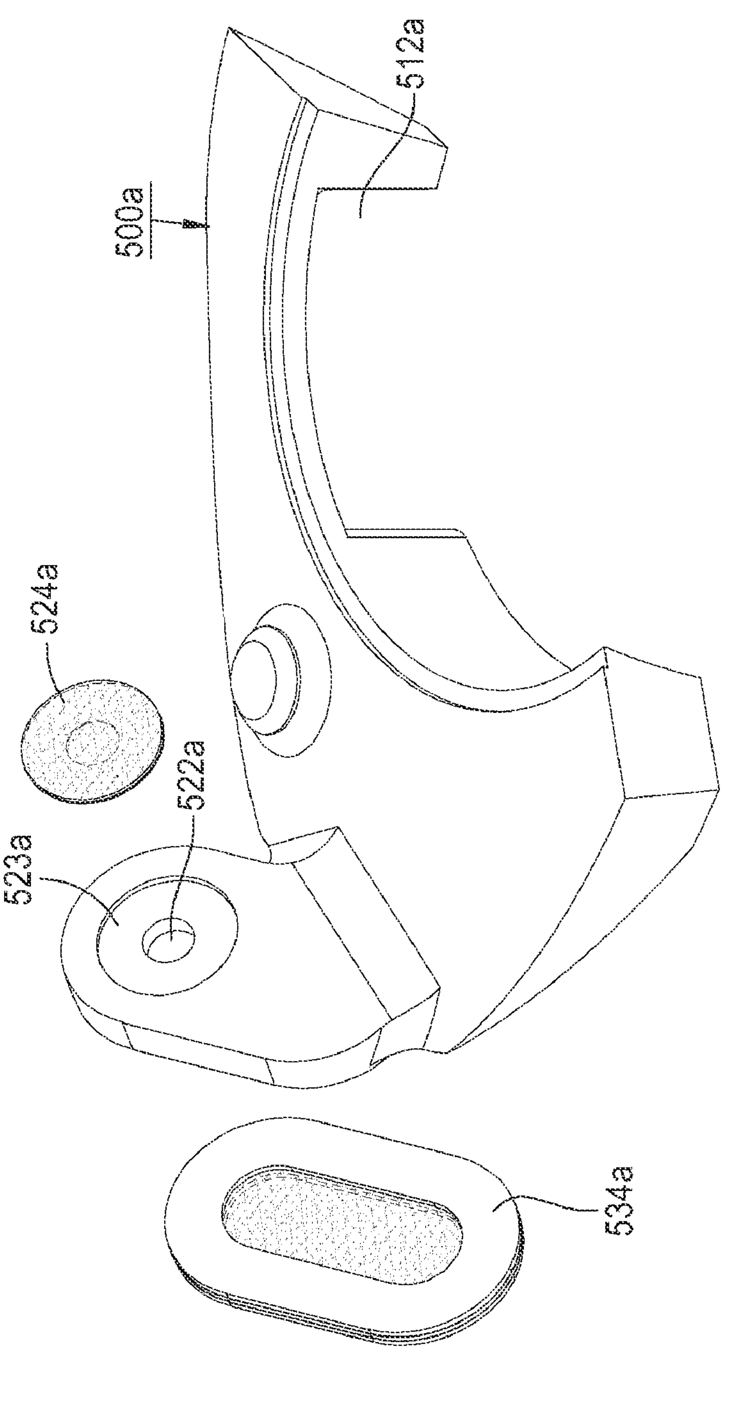
FIG. 12 is a view illustrating a first example of a method for installing a mesh of a duct unit dividing a pressure equilibrium hole and a back hole provided in the earphone according to the second embodiment of the present disclosure.

FIG. 12 is a view illustrating a first example of a method for installing a mesh of a duct unit dividing a pressure equilibrium hole and a back hole provided in the earphone according to the second embodiment of the present disclosure. A back hole mesh 524*a* may be installed on an inner surface on which the back volume 240 (refer to FIG. 2) is formed, and a pressure equilibrium mesh 534*a* may be installed on an outer surface in contact with the front housing 200 (refer to FIG. 2). Here, the pressure equilibrium mesh 534*a* is formed in a size corresponding to the vent hole 250 (refer to FIG. 9) formed in the front housing 200 (refer to FIG. 2).

Figure 13:
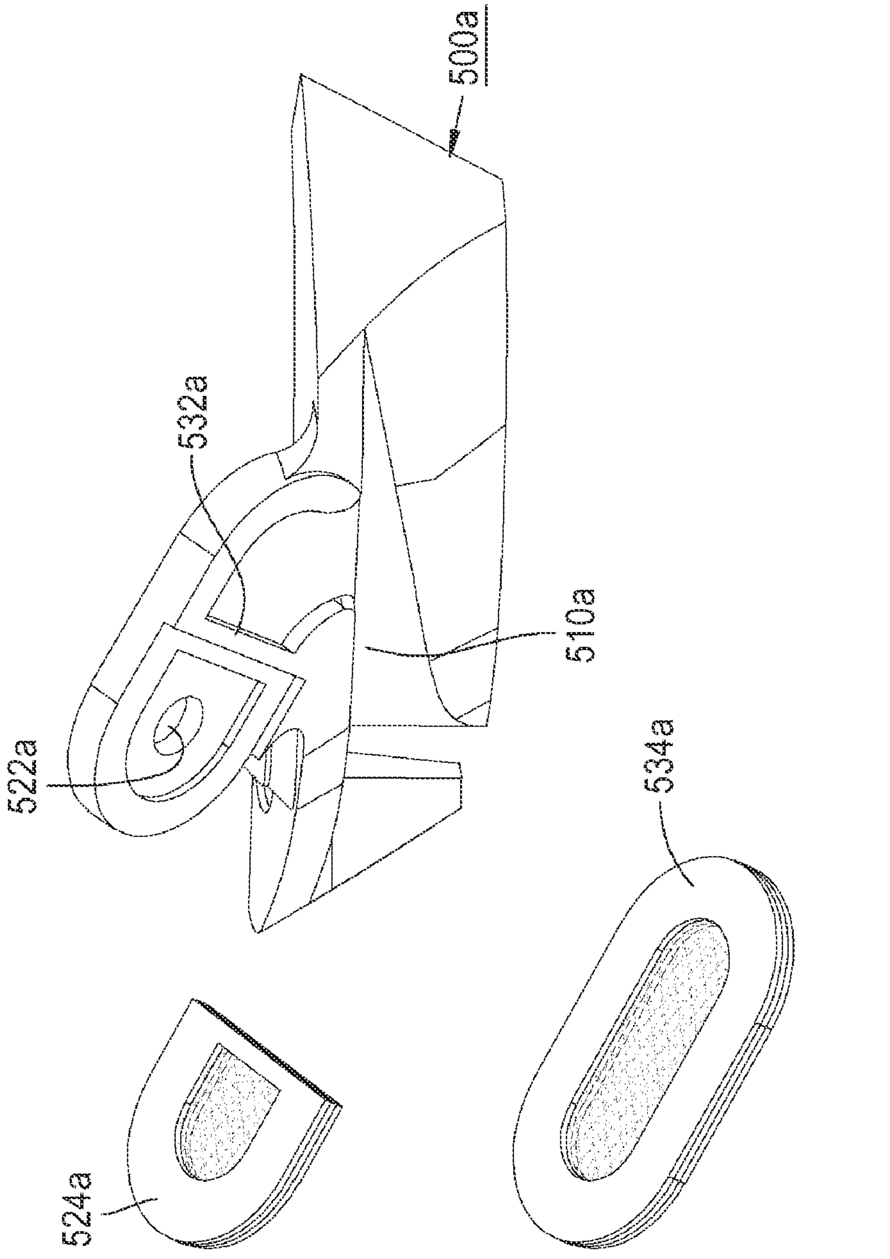
FIG. 13 is a view illustrating a second example of a method for installing a mesh of a duct unit dividing a pressure equilibrium hole and a back hole provided in the earphone according to the second embodiment of the present disclosure.

FIG. 13 is a view illustrating a second example of a method for installing a mesh of a duct unit dividing a pressure equilibrium hole and a back hole provided in the earphone according to the second embodiment of the present disclosure. The back hole mesh 524*a* may be installed on a surface facing the front housing 200 (refer to FIG. 2), and the pressure equilibrium mesh 534*a* may be installed thereon. Here, the back hole mesh 524*a* has a size corresponding to a back hole 522*a* forming portion partitioned by the partition 532*a* in the vent hole coupling portion 530*a*, and the pressure equilibrium mesh 534*a* has a size corresponding to the vent hole 250 (refer to FIG. 9) formed in the front housing 200 (refer to FIG. 2).

Figure 14:
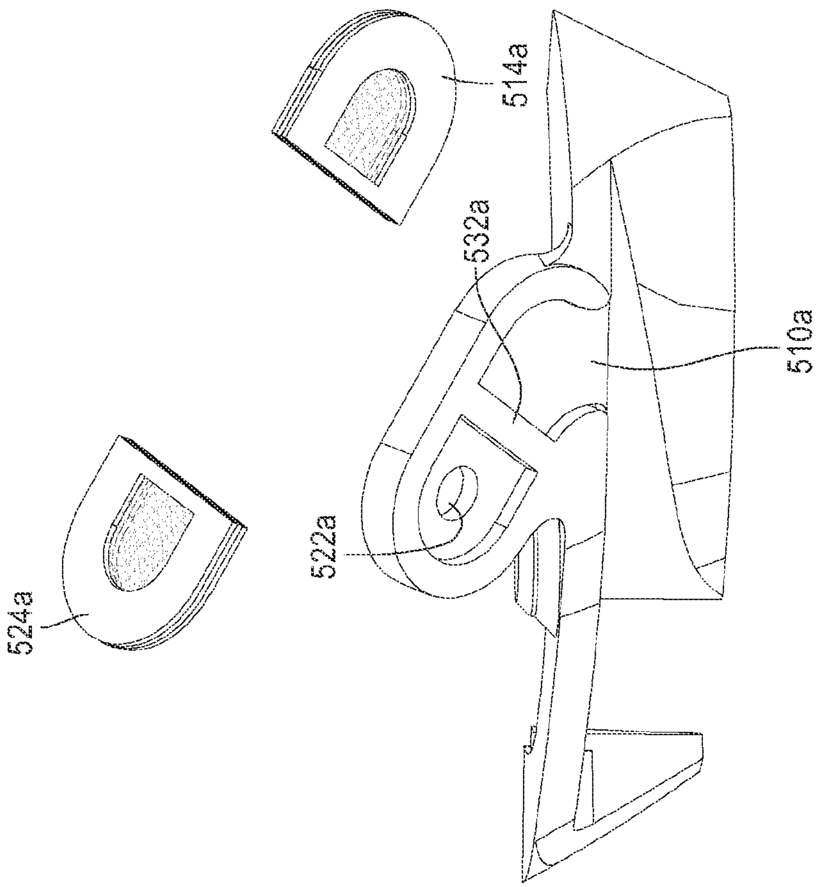
FIG. 14 is a view illustrating a third example of a method for installing a mesh of a duct unit dividing a pressure equilibrium hole and a back hole provided in the earphone according to the second embodiment of the present disclosure.

FIG. 14 is a view illustrating a third example of a method for installing a mesh of a duct unit dividing a pressure equilibrium hole and a back hole provided in the earphone according to the second embodiment of the present disclosure. Both the back hole mesh 524*a* and the pressure equilibrium mesh 534*a* are installed on the surface facing the front housing 200 (refer to FIG. 2). Here, the back hole mesh 524*a* has a size corresponding to the back hole 522*a* forming portion partitioned by the partition 532*a* in the vent hole coupling portion 530*a*, and the pressure equilibrium mesh 514*a* has a size corresponding to a remaining portion partitioned in the vent hole coupling portion 530*a*.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. An earphone with a duct unit dividing a pressure equilibrium hole and a back hole, the earphone comprising:
- a driver unit including a frame, a magnetic circuit, a voice coil, a diaphragm configured to reproduce sound, a pressure equilibrium hole configured to improve a pressure difference between front and rear sides of the driver unit, and a back hole configured to smooth vibration of the diaphragm;
- a housing allowing the driver unit to be installed therein and including a vent hole; and
- a duct unit provided in the housing, adjusting a size of a back volume in the housing, and providing a flow path from the pressure equilibrium hole to the vent hole,
- wherein the duct unit separately divides the flow path from the pressure equilibrium hole to the vent hole and a flow path from a back hole to the vent hole.

2. The earphone of claim 1, wherein the duct unit includes a first duct connecting the pressure equilibrium hole to the vent hole and a second duct connecting the back hole to the vent hole.

3. The earphone of claim 1, further comprising:
- a pressure equilibrium mesh configured to adjust an amount of ventilation through the pressure equilibrium hole; and
- a back hole mesh configured to adjust an amount of ventilation through the back hole.

4. The earphone of claim 1, wherein the duct unit includes a vent hole coupling portion coupled to the vent hole and includes a first duct connecting the pressure equilibrium hole to the vent hole coupling portion.

5. The earphone of claim 4, further comprising:
- a back volume formed in the housing and communicating with the back hole of the driver unit; and
- a communication hole allowing the back volume and the pressure equilibrium hole to communicate with each other and formed in the vent hole coupling portion.

6. The earphone of claim 5, wherein the vent hole coupling portion includes a partition configured to partition a communication hole forming portion and the first duct.

7. The earphone of claim 4, further comprising:
- a back hole mesh installed in the communication hole and configured to adjust an amount of ventilation flowing in and out through the back hole; and
- a pressure equilibrium mesh installed in the vent hole coupling portion and configured to adjust an amount of ventilation flowing in and out through the pressure equilibrium hole.

8. The earphone of claim 1, wherein the duct unit includes a protrusion protruding to the rear side to secure the back volume.

* * * * *